July 21, 1964  L. D. BEARDSLEE  3,141,307
ABSORPTION REFRIGERATION APPARATUS
Filed April 12, 1962  3 Sheets-Sheet 3
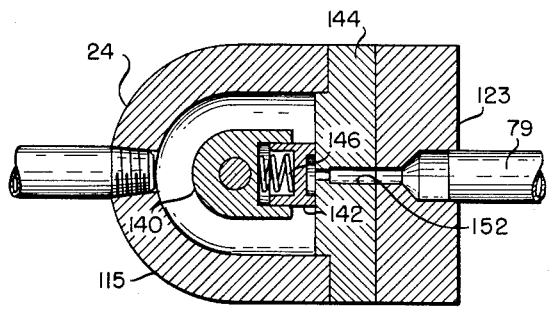
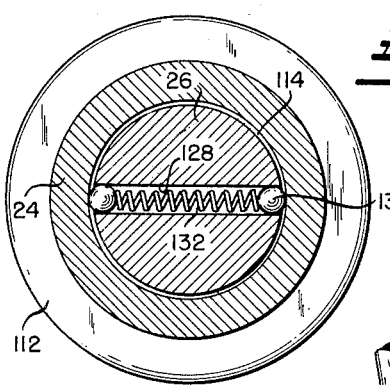
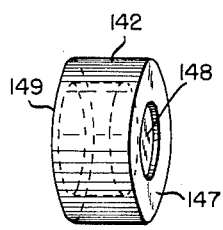
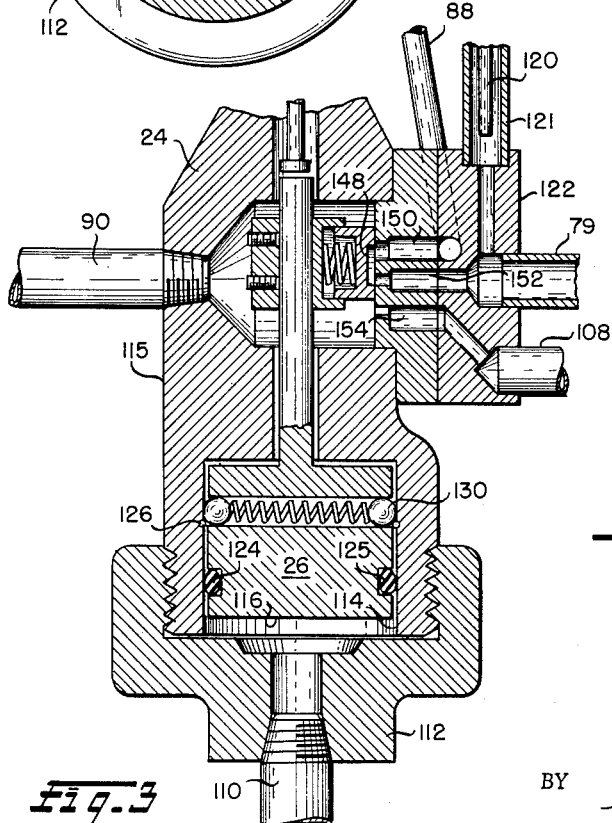
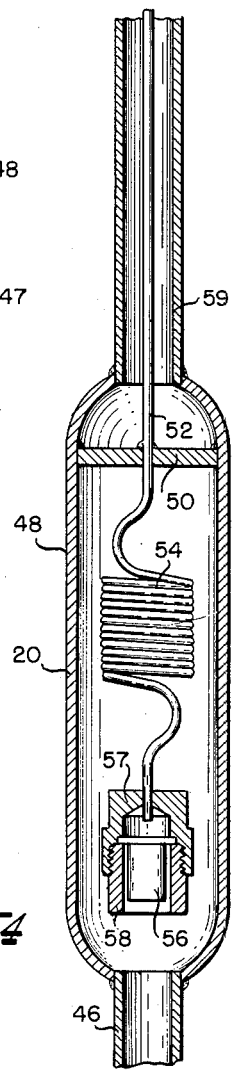
INVENTOR
Lewis D. Beardslee
BY
ATTORNEYS United States Patent Office 3,141,307
Patented July 21, 1964

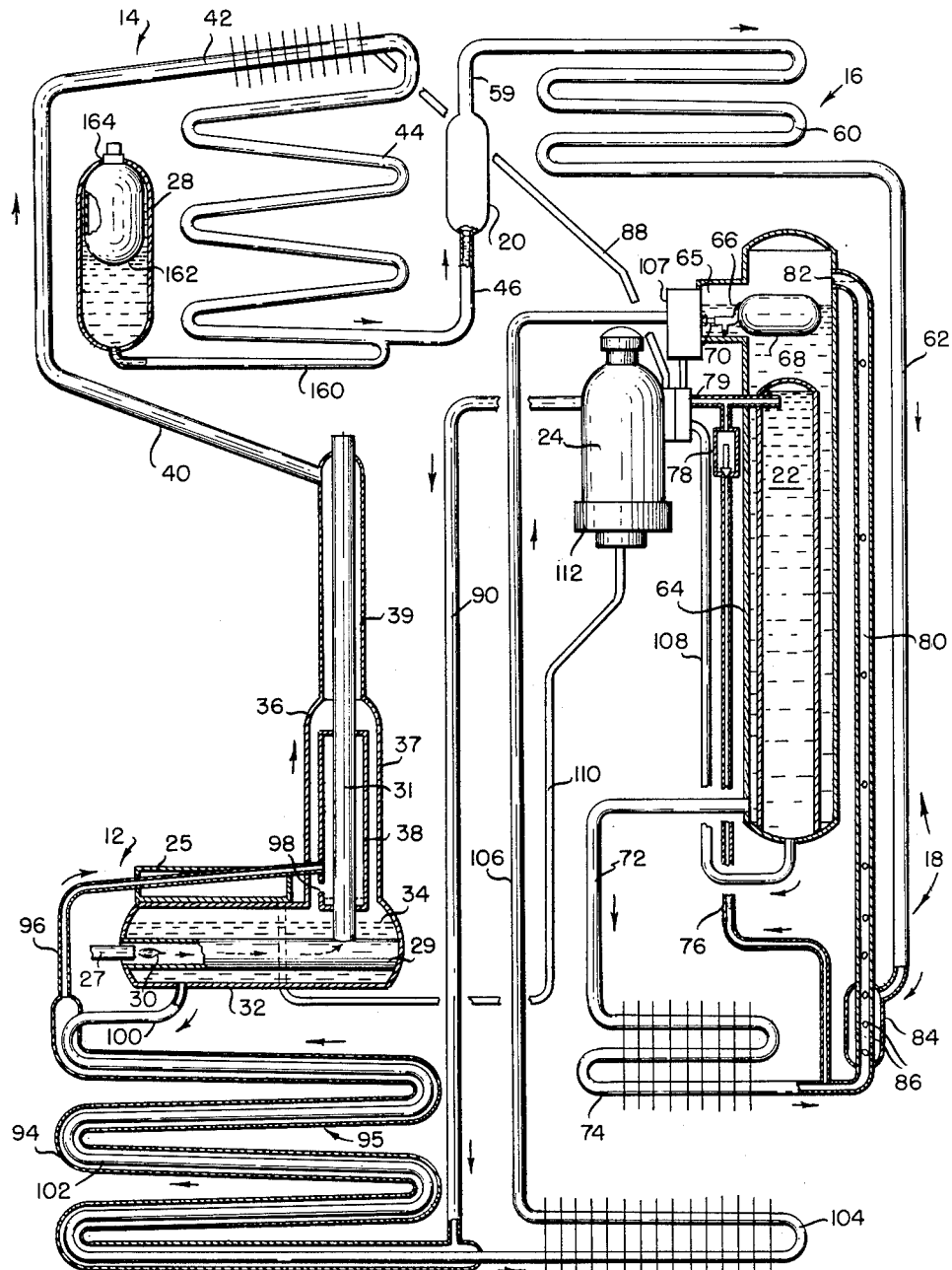

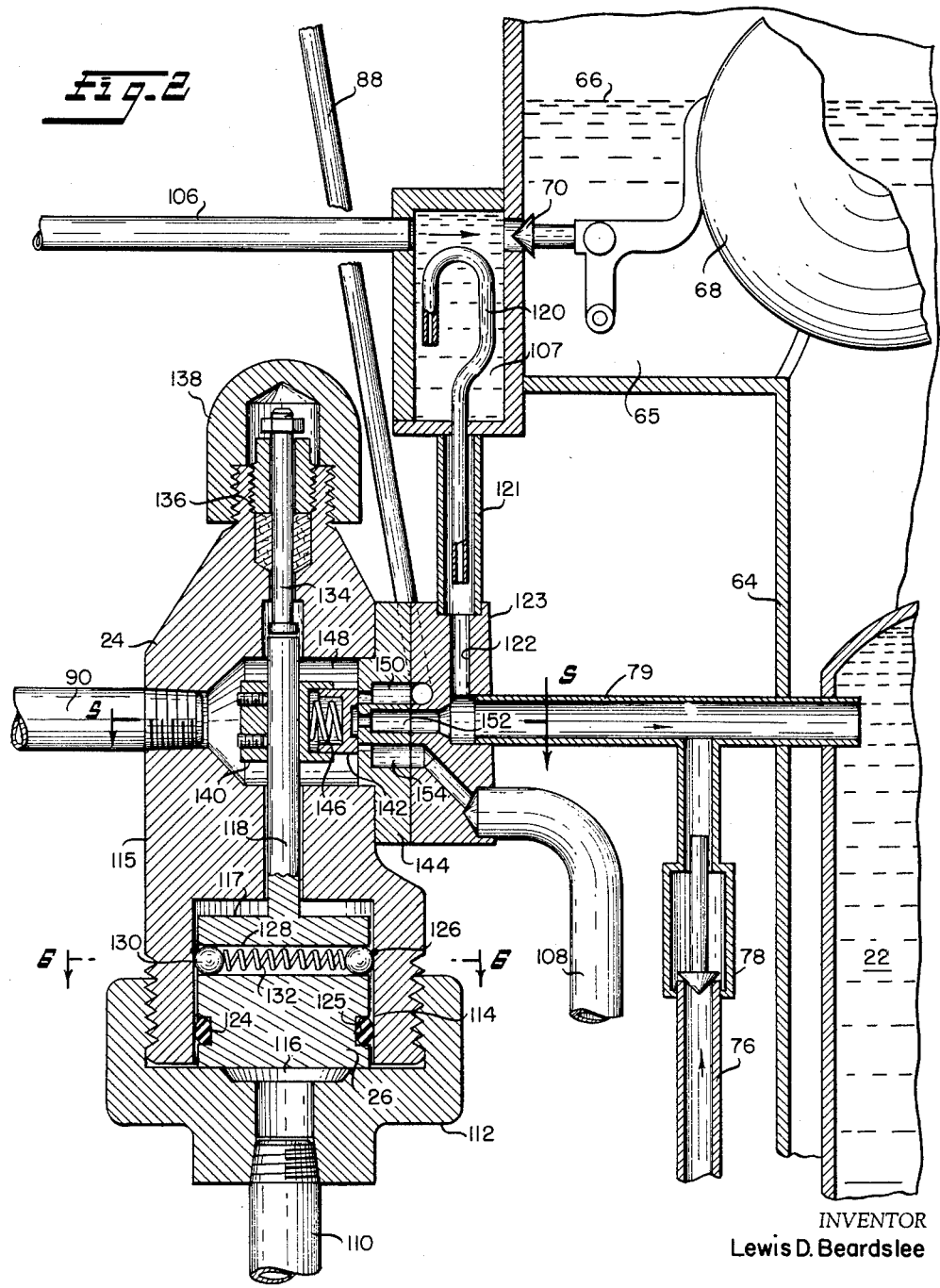

3,141,307
ABSORPTION REFRIGERATION APPARATUS
Lewis D. Beardslee, Greenville, Mich., assignor, by mesne assignments, to Montcalm Inc., Greenville, Mich., a corporation of Michigan
Filed Apr. 12, 1962, Ser. No. 187,024
6 Claims. (Cl. 62—141)

This invention relates to absorption refrigeration apparatus and more particularly to such apparatus of the type in which a transfer chamber is used to return liquid from the absorber to the generator or still.

Systems of this general type, as disclosed for example in U.S. Patent 2,354,705, include a generator adapted to have a mixture of refrigerant and absorbent, as for example ammonia and water, boiled therein by the application of heat; a condenser connected by a vapor conduit to the generator to liquefy the refrigerant vapor delivered thereby; an evaporator or cooling unit in which the liquefied refrigerant is permitted to vaporize, the evaporator having restricted connection to the condenser; an absorber in which the gas from the evaporator is re-absorbed in liquid; and transfer means for effecting the flow of weak liquor from the bottom of the generator to the absorber and flow of rich liquor from the bottom of the absorber to the generator, including a transfer chamber intermediate the absorber and the generator, and a valve mechanism whereby the chamber is selectively connected to the absorber or the generator.

Apparatus of the type disclosed in the aforesaid Patent No. 2,354,705 and other prior art absorption refrigeration units effecting transfer of solutions by alternately connecting a transfer chamber to the low-pressure and high-pressure sides of the system function in a satisfactory manner, but have never achieved any great measure of commercial success primarily because they are too expensive to build, too inefficient in use of fuel and do not provide satisfactory control of refrigeration temperatures.

Primary objects of this invention are to provide a refrigeration unit of the type described, including means to control the pressure so as to regulate the evaporator temperature and conserve fuel when the ambient temperature is low while providing ample refrigeration capacity when the ambient temperature is high; to provide a transfer valve not requiring the precise machining operations necessary to produce previous valve structures and which is less expensive to build and more reliable in operation than previous valves; and to provide a simplified generator and absorber structure more suitable for installation in domestic refrigerator cabinets and for manufacture by volume production methods.

Other features and advantages of the invention will be apparent from the following description of a preferred embodiment and the accompanying drawings in which:

FIGURE 1 is a partly schematic diagram of an absorption refrigeration unit suitable for incorporation in a domestic refrigerator cabinet and incorporating the invention, with some of the parts shown in section;

FIGURE 2 is an enlarged sectional view of the improved transfer valve and associated parts incorporated in the unit shown in FIGURE 1, with the valve in its lower operating position;

FIGURE 3 is a fragmentary sectional view of the same valve in its upper position;

FIGURE 4 is an enlarged sectional view of the junction between the high and low pressure sides of the system, showing the structure of the capillary expansion tube;

FIGURE 5 is a horizontal section through the transfer valve taken on line 5—5 of FIGURE 2;

FIGURE 6 is a horizontal section through the valve piston taken on line 6—6 of FIGURE 2; and FIGURE 7 is a perspective view of the valve disc which connects the transfer chamber alternately to the high and low pressure sides of the unit.

As shown in FIGURE 1, the unit is composed of a generator section indicated generally at 12, a condenser section indicated generally at 14, an evaporator section indicated generally at 16 and an absorber section indicated generally at 18, and is charged with a solution of ammonia and water having a concentration of about 29% $NH_3$ by weight, although the concentration of the charge can be varied to suit the conditions under which the unit is to be used. The volume of the charge is sufficient to fill the generator and absorber to the desired levels, the charge in the embodiment shown herein weighing 12 pounds. The unit is constructed of welded steel tubes and shells.

As explained more fully below, the charge is heated in the generator or still 12, the ammonia vapor evolved by heating is liquefied by cooling in the condenser 14, the condensate passes through the restrictor (indicated generally at 20 and shown in detail in FIGURE 4) and re-evaporates in the evaporator 16, the vapor is re-absorbed in the solution in the absorber 18, and means is provided to circulate weak liquor (from which ammonia has been evaporated) from the generator to the absorber and strong liquor (which has absorbed ammonia gas from the evaporator) from the absorber to the generator, including a transfer chamber 22 and a valve mechanism indicated generally at 24 which alernately connects chamber 22 to the high pressure and to the low pressure sides of the system.

The valve 24 is actuated by the difference in pressure between the solution in the generator and a solution of ammonia and water confined in a bulb 25 subjected to the heat of the generator but cooled by the returning strong liquor. The difference in the two pressures move a piston 26 incorporated in valve 24.

A burner 27 supplies heat to the generator. The rate of distillation therein depends on the amount of heat supplied which can be controlled by means not shown, such as a manual valve or a thermostat subjected to the temperature of the space to be cooled.

However the distillation rate is also a function of the pressure in the system which varies with change in ambient temperature. In hot weather, heat dissipation from the condenser and absorber is reduced, the pressure in the system rises and the concentration of the charge must be kept low enough to provide the required low evaporator temperature under the most severe conditions of climate and load. In units of prior design, when the ambient temperature falls and the refrigeration load is light, the pressure in the system becomes low, the evaporator becomes too cold, food to be refrigerated may freeze and liquid refrigerant will not all evaporate in the evaporator but returns as liquid to the absorber, wasting fuel.

In order to overcome this fault of prior systems, there is incorporated in this unit a refrigerant reservoir 28 connected to the bottom of the condenser, which provides means to keep out of circulation part of the refrigerant, the amount increasing as the condenser pressure increases. When the condenser pressure is high, more ammonia is withdrawn from circulation, producing a lower concentration in the absorber, more rapid absorption, a lower evaporator pressure and a lower evaporator temperature. When the condenser pressure drops, refrigerant is fed back to the system from reservoir 28, raising the concentration in the absorber and thus preventing the usual excessive drop in evaporator pressure and temperature. Thus the initial charge can contain a larger percentage of ammonia than has been customarily used in prior systems.

The variation in the capacity of reservoir 28 is produced by balancing the variable condenser pressure against the pressure exerted by a gas confined in a flexible bag within the reservoir. As the condenser pressure drops, the bag expands and reduces the amount of refrigerant in the reservoir.

Burner 27 projects into a horizontal flue 29 in generator 12, the flame 30 burning within the flue, with products of combustion leaving through a vertical flue leg 31. Body 32 of the generator is a horizontal cylinder through which flue 29 extends and is filled with the ammonia-water solution to a level 34.

Vapors boiled from the solution rise within a vertical analyzing tower 36 which projects upward from the top of generator body 32 and surrounds vertical flue leg 31. Tower 36 is enlarged in diameter at its lower portion 37 to accommodate a shell 38 surrounding flue leg 31 and is reduced in diameter at 39 above shell 38. The analyzing tower may contain baffles and/or fins (not shown) to aid in separating ammonia vapor from drops of water which drain back to the generator, the vapor leaving the upper end of tower 36 and passing upward through a tube 40 to a rectifier 42 which is an inclined finned tube in which the vapors are cooled sufficiently to re-condense water vapor but not ammonia gas. The condensate drains back to the generator.

After passing the rectifier, the refrigerant gas passes downward through condenser tube 44 which is downwardly pitched in the direction of flow and may be finned or otherwise cooled as by running water or a fan. Under the high pressure produced when the generator is heated, the vapor condenses as it is cooled in the condenser 14 so that the lower leg of the condenser is filled with liquid refrigerant which travels upward through a tube 46 to a restrictor 20.

As shown in FIGURE 4, the restrictor is formed of a cylindrical shell 48, the interior of which is divided by a transverse partition 50 through which extends a capillary tube 52, the lower part of which forms a coil 54 to provide a considerable length of tube in a small space. At the bottom of the capillary tube is a filter 56, held in a housing 57 by a sleeve 58. The filter prevents plugging of the capillary tube by foreign matter such as pipe scale.

Capillary 52 extends upwardly into a tube 59 which connects to a tube coil 60 in evaporator 16. Liquefied ammonia flows through the capillary tube, the restriction and friction therein causing a pressure drop from that in the high side existing in tube 46 to the low pressure in the evaporator tube coil 60. Under this low pressure, the ammonia refrigerant evaporates cooling evaporator coil 60.

The refrigerant vapor passes down tube 62 to the absorber 18. The absorber body includes a vertical cylindrical shell 64 surrounding the transfer chamber 22, the bottom of which is above the liquid level 34 in the generator. Shell 64 has a laterally projecting leg 65 at its upper end, and is filled with ammonia-water solution to a level 66 within this leg. A float 68 controls a valve 70 which admits more solution to the absorber when the level drops, as will be presently described.

A tube 72 connects the interior of the absorber shell 64 at a point near its lower end to a finned cooling coil 74. The outlet of coil 74 is connected to a vertical tube 76 containing a check valve 78 which permits flow upward through tube 76 into a cross tube 79, but prevents flow downward. The outlet of coil 74 is also connected to the bottom of an absorption tube 80, the upper end of which is connected to the interior of shell 64 at a point 82 just above the liquid level 66.

The lower end of absorption tube 80 is surrounded by a cylindrical shell 84, the interior of which is in communication with the interior of tube 80 through several holes 86. Tube 62 from the evaporator is connected to the upper part of shell 84 and delivers refrigerant vapor to the interior thereof. This vapor enters absorption tube 80 through holes 86. Bubbles of the vapor rise through the solution in tube 80, are absorbed therein and produce a gas lift effect causing the solution to overflow at 82 from the tube into the interior of shell 64 and setting up a circulation through tube 72, cooling coil 74 and absorption tube 80.

Since the solution is cooled as it passes through coil 74, it readily dissolves the cold vapor entering from tube 62, the solution in shell 64 gradually increasing in concentration as the solution in generator 12 decreases in concentration due to boiling away of ammonia therein. Transfer chamber 22 will also fill with solution in a manner to be presently described.

When the generator concentration has been reduced from its original value of about 29% $NH_3$ to about 15%, and its temperature has increased to about 330° F., resulting in a high side pressure of about 230 pounds per square inch, the concentration in the absorber will have risen to about 32%. At this time valve 24 will function to open communication between transfer chamber 22 and the high pressure side of the system.

A tube 88 connects the upper end of the rectifier 42 with valve 24. Another tube 90 connects valve 24 with an outer passage 94 of a heat exchanger 95, the outlet of tube 94 being connected through a tube 96 with the interior of shell 38 at an elevation below the bottom of transfer chamber 22. Tube 96 passes through and is in heat exchange relation with bulb 25. Shell 38 has a hole 98 in its side wall above the bottom thereof and below the outlet of tube 96. Another tube 100 connects the bottom of the generator body 32 with the interior passage 102 of heat exchanger 95. The outlet of passage 102 is connected to the inlet of a finned cooling coil 104, the outlet of which is connected by a tube 106 with the inlet chamber 107 of absorber 18.

The bottom of transfer chamber 22 is connected by a tube 108 with valve 24. The upper end of tube 76 (containing check valve 78) is connected to cross-tube 79 leading to the interior of the transfer chamber.

The bottom of bulb 25 is connected by a tube 110 and a nut 112 with a cylinder 114 formed in the lower part of the cast body 115 of valve 24. (See FIGURE 2.) Within this cylinder is a piston 26, the lower face 116 of which is subjected to pressure transmitted from bulb 25 through tube 110 while its upper surface 117 is under generator pressure transmitted through tube 90 and around the stem 118 of piston 26.

When burner 27 is first lit, the valve is in the lower position as shown in FIGURE 2 or will be moved there by the rise in pressure in the generator transmitted to the upper face of the piston, the pressure rise also forcing solution from the generator through a first passage comprising tube 100, coil 102, coil 104, tube 106 and valve 70 into absorber shell 64, until float 68 closes valve 70 when level 66 is attained.

Within inlet chamber 107 is a restrictor 120 formed from capillary tubing. The outlet from the restrictor is located within a tube 121, the upper end of which is closed while the lower end connects by hole 122 in a manifold plate 123 to tube 79. Liquid from the generator at high pressure continues to flow slowly through the restrictor 120 to chamber 22, maintaining the interior thereof under high pressure.

Bulb 25 is charged with the same solution as was originally put into the generator. As the generator temperature rises, the temperature of bulb 25 also rises. At first the bulb temperature lags behind the generator temperature. Since the concentration in the generator drops as it is heated, while the concentration in the bulb remains substantially constant, the pressure in bulb 25 eventually will rise faster than that in the generator. Then the pressure on the bottom of piston 26 will become greater than the pressure on the top transmitted through tube 90. Leakage of fluid between the bottom and top of the piston is prevented by O-ring 124 in a groove 125 in the piston side wall.

A wire ring 126 positioned in a groove in the wall of cylinder 114 projects partway into the interior of the cylinder. In a cross hole 128 drilled through piston 116 are two metal balls 130, forced apart by a spring 132 against the cylinder wall just below the ring 126 when the piston is in its lower position shown in FIGURE 2. These balls retain the piston in this position until the pressure on the piston exceeds that on the top by an amount sufficient to compress spring 132 and snap the piston up to the position shown in FIGURE 3 with balls 130 just above ring 126.

Above valve stem 118 is a rod 134 extending through a packing and gland 136 at the top of body 115 of the valve. A cap 138 makes a leakproof seal around the packing and rod. When the unit is first started, if it is necessary, the cap can be removed, the rod 134 used to force the piston into its lower position and the cap then replaced.

Attached to stem 118 by setscrews is a yoke 140 supporting a sliding valve disc 142 against a valve plate 144 attached to manifold 123. A spring 146 presses the disc against the plate. Disc 142, shown in FIGURE 7, has a flat annular face 147 with a depression 148 in the center. A recess 149 positions the spring.

Plate 144 has three ports, 150, 152 and 154, drilled through it. Port 150 connects through a passage in manifold 123 to the interior of tube 88; port 152 connects through another passage to the interior of tube 79; port 154 connects through a third passage to the interior of tube 108. The ports are located so that when the valve piston is in its lower position as shown in FIGURE 2, ports 150 and 154 are closed by face 147 of the disc, while port 152 is opposite depression 148 and thus is deadended. When the valve has moved to its upper position as shown in FIGURE 3, depression 148 connects ports 150 and 152, while port 154 is below the lower edge of disc 142 and is thus in communication with tube 90.

Hence, when the piston has snapped to the upper position by the excess pressure on its bottom face, high-pressure gas from rectifier 42 will flow through a fourth passage including a tube 88 to port 150, through depression 148 to port 152, through tube 79 to transfer chamber 22. Since chamber 22 is above the generator, its liquid contents will flow out of the bottom by gravity through a third passage comprising tube 108, port 154, tube 90, outer coil 94 of the heat exchanger (where it will be warmed by the warmer fluid in the inner coil) through tube 96 (where it will be heated by hot bulb 25) into chamber 38 (where it will be further heated by hot flue leg 31), overflowing through hole 98 into generator body 32 tending to raise the level therein.

Passage of the liquid from the transfer chamber through tube 96 cools bulb 25 rapidly, causing the pressure therein to fall, thus reducing the pressure below piston 26. When the pressure has dropped sufficiently, the piston will return to the position shown in FIGURE 2, closing ports 150, 152 and 154.

Chamber 22 is enclosed within absorber shell 64, so that the absorber and transfer chamber attain about the same temperature. Pressure from the generator now causes a small amount of weak liquor to flow through restrictor 120, absorbing any gas therein and lowering its pressure below that in the absorber, since the latter contains strong liquor at the same temperature. As soon as the pressure in the transfer chamber falls below that in the absorber, strong liquor will flow into and fill chamber 22 through a second passage comprising tube 72, cooler 74 and tube 76, flowing past check valve 78. This lowers level 66, causes float 68 to drop opening valve 70, which permits weak liquor from the generator to flow through tube 100, inner tube 102 of the heat exchanger (where it is cooled by the liquid in the outer tube), through cooling coil 104, tube 106 and valve 70 into the absorber until level 66 is attained, when float 68 will close valve 70. This completes a cycle of operation which normally takes about six minutes, although the time will vary, depending on the heating rate and other conditions.

At the bottom of condenser 14, a branch tube 160 connects the lowest part of coil 44 with reservoir 28, which is a vertical steel cylinder within which is an expansible, flexible bag 162, made of a synthetic elastomer such as neoprene, not affected by the refrigerant charge. The top of the bag is attached to the top of the cylinder by a valve 164 through which a gas such as nitrogen can be introduced into the bag, which is filled with the gas to any desired pressure, in the present embodiment to 180 pounds per square inch.

When the unit is cold, the bag will distend and practically fill reservoir 28. As the pressure outside the bag rises when the burner is in operation, the bag will contract and allow liquid ammonia from the condenser to enter the space between the bag and the cylinder through tube 160. This ammonia is withdrawn from the circulating solution, reducing the concentration in the absorber and lowering the evaporator pressure and hence the temperature.

Thus in hot weather when the pressure is high, the reservoir will be nearly filled with ammonia, the concentration in the absorber will be low and both pressure and temperature in the evaporator will be low. In cooler weather when the condenser pressure is lower, the higher pressure in bag 162 will force part of the stored ammonia out of reservoir 28, raising the concentration in the absorber and counteracting the tendency for the evaporator pressure and temperature to fall.

The refrigeration unit herein disclosed provides a more practical apparatus for the production of refrigeration by means of heat than devices heretofore available, being particularly adaptable for use in a domestic refrigerator using gas as fuel. It is simple to build and economical to operate. Evaporator temperatures remain reasonably constant regardless of changes in outside temperatures, preventing the freezing of stored food in cool weather and allowing regulation of the refrigeration by changing the heat input to the generator.

The valve construction eliminates the need for precision manufacturing procedures required in the production of prior absorption units which make use of a transfer chamber for return of liquid from the low-pressure to the high-pressure sides of the system.

The embodiment disclosed is capable of changes in the construction and arrangement without departing from the scope of the invention as disclosed in the appended claims. While in the example described above the charge in the expansible bag is under a pressure of 180 pounds per square inch, the pressure of the gas can be provided to suit conditions under which the apparatus is to be used and the temperature to be maintained in the evaporator, best results being obtained when the gas pressure is in the range of 150 to 250 pounds per square inch absolute.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an absorption refrigeration system including a generator and a condenser operating at high pressure and an evaporator and an absorber operating at lower pressure, with a refrigerant-absorbent solution filling the generator and absorber to predetermined levels: a transfer chamber; means providing a first passage connecting the generator at a point below the liquid level therein with the absorber through a float-operated valve therein, said valve being open when the liquid level in the absorber is below a predetermined elevation and closed when said elevation is reached; means providing a second passage connecting the bottom of the absorber with the top of said transfer chamber, said second passage containing a check valve permitting flow of the solution from the absorber to the transfer chamber, but preventing flow in the reverse direction; means providing a restricted passage connecting said first passage with the top of the transfer chamber; a two-position transfer valve providing in its first position a third passage which connects the bottom of the transfer chamber with a point in the generator above the liquid level therein but below the bottom of the transfer chamber, and providing a fourth passage connecting the top of the transfer chamber with a point in the generator above the liquid level therein, said transfer valve in its second position closing said third and fourth passages, means for moving said transfer valve to its first position when the generator is heated to a predetermined high temperature and means for moving said transfer valve to its second position upon substantial flow of solution from the absorber to the generator through said third passage.

2. The combination according to claim 1 in which the transfer valve is a slide valve including a fixed member having ports forming portions of said third and fourth passages and a slide held against said member by a spring, said slide being movable to open said ports when the valve is in said first position and to close said ports when the valve is in its second position.

3. The combination according to claim 1 in which there is a bulb in heat transfer relation with the generator and with a conduit included in the third passage, the bulb being heated by the heat in the generator and cooled by fluid flowing through said conduit from the transfer chamber to the generator, said bulb containing a charge which generates a pressure when the bulb is heated; and motor means movable to one position when the generator pressure exceeds the pressure in said bulb and to a second position when the pressure in said bulb exceeds the generator pressure, and means connecting said motor means to said transfer valve for simultaneous movement therewith.

4. An absorption refrigeration system adapted to provide a continuous refrigerating effect, comprising, a generator and a condenser adapted to operate at high pressure; an evaporator and an absorber adapted to operate at a lower pressure; with a refrigerant-absorbent solution filling the generator and absorber to predetermined levels: a chamber adapted to be connected alternately to the high-pressure portion and to the low-pressure portion of the apparatus, said chamber being positioned at a higher elevation than the liquid level in the generator; means permitting the flow of said solution from the low pressure portion of the system when the pressure in said chamber is less than the pressure in said low pressure portion of said system; valve means effective when in a first position to permit flow of said solution from said chamber to a conduit connected to said high pressure portion of said system and when in a second position to block said flow; a bulb containing a charge of the same composition as the refrigerant-absorbent charge in the system, said bulb being in heat exchange relation with said generator and with said conduit; a piston operating within a cylinder and adapted to shift said valve means between said first and second positions; means connecting the interior of the cylinder on one face of the piston to the charge within said bulb; further means connecting the cylinder on the opposite face of the piston to the charge within the generator, whereby the piston will be biased to shift said valve means to said first position when the pressure in the bulb exceeds the pressure in the generator, and will be biased to shift said valve means to said second position when the pressure in the generator exceeds the pressure in the bulb; and detent means to restrain the piston from movement until there is a predetermined difference in pressure on opposite faces of the piston.

5. In an absorption refrigeration apparatus of the class described, including a generator, a condenser, an evaporator and an absorber: means for controlling the evaporator temperature comprising a reservoir in communication with the condenser near its outlet end and a displacement member within said reservoir, said displacement member varying the volume of the reservoir in response to changes in the pressure existing in the condenser.

6. The combination according to claim 5 in which the displacement member is an expansible bag charged with a gas under a pressure between 150 and 250 pounds per square inch absolute.

References Cited in the file of this patent

UNITED STATES PATENTS

| | | |
|---|---|---|
| 1,822,224 | Knight | Sept. 8, 1931 |
| 2,055,856 | Bergholm | Sept. 29, 1936 |
| 2,146,078 | Ullstrand | Feb. 4, 1939 |
| 2,178,561 | Coons | Nov. 7, 1939 |
| 2,251,314 | Ashby | Aug. 5, 1941 |
| 2,339,814 | Roth | Jan. 25, 1944 |
| 2,386,817 | Schurtz et al. | Oct. 16, 1945 |
| 2,587,629 | Kogel | Mar. 4, 1952 |
| 2,653,454 | Buchel | Sept. 29, 1953 |